(12) United States Patent
Arunachalam et al.

(10) Patent No.: US 10,541,985 B2
(45) Date of Patent: Jan. 21, 2020

(54) COORDINATED PACKET DELIVERY OF ENCRYPTED SESSION

(71) Applicant: NOKIA SOLUTIONS AND NETWORKS OY, Espoo (FI)

(72) Inventors: Swaminathan Arunachalam, Plano, TX (US); Ram Lakshmi Narayanan, Pleasanton, CA (US); Meir Cohen, Plano, TX (US); Nurit Sprecher, St. Petach Tikva (IL)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 93 days.

(21) Appl. No.: 15/537,599

(22) PCT Filed: Dec. 18, 2015

(86) PCT No.: PCT/US2015/066838
§ 371 (c)(1),
(2) Date: Jun. 19, 2017

(87) PCT Pub. No.: WO2016/100896
PCT Pub. Date: Jun. 23, 2016

(65) Prior Publication Data
US 2018/0270209 A1    Sep. 20, 2018

Related U.S. Application Data

(60) Provisional application No. 62/094,908, filed on Dec. 19, 2014.

(51) Int. Cl.
*H04L 29/00* (2006.01)
*H04L 29/06* (2006.01)
(Continued)

(52) U.S. Cl.
CPC ......... *H04L 63/0485* (2013.01); *H04L 41/50* (2013.01); *H04L 47/32* (2013.01); *H04L 63/0457* (2013.01); *H04L 69/324* (2013.01)

(58) Field of Classification Search
CPC ......... G06F 21/62; H04L 41/50; H04L 47/32; H04L 63/0428; H04L 63/0485; H04L 69/324; H04L 63/0457
See application file for complete search history.

(56) References Cited

U.S. PATENT DOCUMENTS 6,963,972 B1    11/2005 Chang et al.
8,429,255 B1 *   4/2013 Khan ............... H04L 47/10
                                                 709/220
(Continued)

FOREIGN PATENT DOCUMENTS

CN    1466839 A    1/2004
CN  102404197 A    4/2012
(Continued)

OTHER PUBLICATIONS

ETSI GS MEC 002 v1.1.1 (Mar. 2016); Mobile Edge Computing (MEC); Technical Requirements.
(Continued)

*Primary Examiner* — Don G Zhao
(74) *Attorney, Agent, or Firm* — Squire Patton Boggs (US) LLP

(57) ABSTRACT

Various communication systems may benefit from appropriate handling of secure data. More specifically, certain packet-based communication systems may benefit from a mechanism to support coordinated packet delivery of one or more encrypted sessions. A method can include identifying metadata for an application flow, wherein the application (Continued)

flow is encrypted. The method can also include publishing the metadata in a core network, wherein the metadata is unencrypted when published.

16 Claims, 8 Drawing Sheets

(51) Int. Cl.
*H04L 12/24* (2006.01)
*H04L 12/823* (2013.01)
*H04L 29/08* (2006.01)

(56) References Cited

U.S. PATENT DOCUMENTS

| | | |
|---|---|---|
| 2006/0224596 A1* | 10/2006 | Bird .................... G06F 17/3089 |
| 2007/0016802 A1 | 1/2007 | Wingert et al. |
| 2007/0112779 A1 | 5/2007 | Gargi et al. |
| 2012/0084554 A1* | 4/2012 | Van Gorp ........... H04L 63/0428 713/150 |
| 2013/0066831 A1 | 3/2013 | Stephens et al. |
| 2013/0077486 A1* | 3/2013 | Keith .................. H04L 47/2433 370/230.1 |
| 2014/0280211 A1 | 9/2014 | Rash et al. |
| 2014/0334302 A1* | 11/2014 | Loach ..................... H04L 47/32 370/235 |
| 2015/0227268 A1* | 8/2015 | Rathod ............. G06F 17/30867 715/739 |
| 2016/0164826 A1* | 6/2016 | Riedel ................. H04L 61/1511 709/223 |
| 2016/0205570 A1 | 7/2016 | Bedekar et al. |
| 2018/0232522 A1* | 8/2018 | Shear .................. H04L 63/0861 |
| 2018/0302443 A1* | 10/2018 | Weiss ...................... G06F 21/74 |

FOREIGN PATENT DOCUMENTS

| | | |
|---|---|---|
| KR | 20030040481 A | 5/2003 |
| WO | 02/28006 A2 | 4/2002 |
| WO | WO 2014/060584 A1 | 4/2014 |

OTHER PUBLICATIONS

A, Jain et al; Mobile Throughput Guidance Inband Signaling Protocol draft-flinck-mobile-throughput-guidance-04.txt; Mar. 13, 2017, IETF.
A. Jaine et al; Requirements and reference architecture for Mobile Throughput Guidance Exposure draft-sprecher-mobile-tg-exposure-req-arch-03.txt; Mar. 13, 2017, IETF.
Peter Szilagyi et al; Mobile Content Delivery Optimization based on Throughput Guidance; IETF; Jul. 22, 2015.
International Preliminary Report on Patentability International Application No. PCT/US2015/066838 dated Jun. 29, 2017.
International Search Report & Written Opinion dated Feb. 23, 2016 corresponding to International Patent Application No. PCT/US2015/066838.
T. Eckert et al., "A Framework for Signaling Flow Characteristics between Applications and the Network draft-eckert-intarea-flow-metadata-framework-02," Internet Engineering Task Force (IETF), Oct. 21, 2013, pp. 1-36.
European Search Report application No. 15871218.2 dated Aug. 7, 2018.
Feb. 7, 2019 Office Action issued in Korean Patent Application No. 10-2017-7020090.
First Office Action issued in corresponding Chinese Patent Application No. 201580076493.X, dated Oct. 25, 2019, with partial English translation.
B. Rijsman et al., "Metadata Considerations draft-rijsman-sfc-metadata-considerations-00.txt", IETF, Feb. 12, 2014.

* cited by examiner

COORDINATED PACKET DELIVERY OF ENCRYPTED SESSION

CROSS-REFERENCE TO RELATED APPLICATION

This application is related to and claims the benefit and priority of U.S. Provisional Patent Application No. 62/094,908, filed Dec. 19, 2014, the entirety of which is hereby incorporated herein by reference.

BACKGROUND

Field

Various communication systems may benefit from appropriate handling of secure data. More specifically, certain packet-based communication systems may benefit from a mechanism to support coordinated packet delivery of one or more encrypted sessions.

Description of the Related Art

Mobile core network, radio network with Mobile Edge Computing (MEC), and wire line network can provide a collection of service enablers for providing Value Added Services (VAS) and can improve network operational efficiency. A typical user may get service based on subscription or category of application traffic types. To differentiate and control traffic based on subscription or various other criteria operators can deploy middle-boxes on their networks.

Depending upon type of service, traffic may pass through one or more middle-box functions deployed in the networks. Operators can deploy middle-boxes on wired and wireless networks and a goal of the middle-box can be to improve operational efficiency for the network and/or to scale the network.

As an example, FIG. 1 illustrates various middle-boxes deployed by operators in a wireless SGi LAN interface. Most commonly used middle-box functions can include Carrier Grade Network Address Translation (CG-NAT), Firewall, Web Optimizer (not shown), Video Optimizer, TCP optimizer, caching server, Load Balancer, Proxy, Analytics, and the like.

FIG. 1 shows deployment scenario of middle-box functions and how different packets go through series of network interfaces. Multiple network functions can be connected or chained to provide a network service. Packets can get different treatment based on the path selected and the middle-box that it encounters. The way middle-boxes are interconnected in SGi LAN can be referred to as service chaining. Using service chaining, operators can create new applications, for example delivering customized services that provide incremental value. Typically, most of the middle-boxes do deep packet inspections to do the flow identification.

Nevertheless, current usage of service chaining and middle-box may not be effective. For example, application service providers (ASPs) have started to deliver their service over encrypted secure socket layer (SSL) traffic. The operator is conventionally unable to inspect the traffic that flows through their networks when it is encrypted in this way. Furthermore, certain classes of middle-boxes operate on HTTP and not encrypted HTTP. Furthermore, there may be several optimizers on a path between device client to application server, and these optimizers may be running without any mutually agreed standards.

More generally, the growing rate of internet traffic encrypted with SSL over access networks has both immediate and long-term impacts on the access networks ecosystem and access technology architectures. Here, the term access network can include both wired and wireless network architectures. Thus, access network can refer to the portion of the end-to-end (E2E or e2e) path between the device and the application server within the operator network.

Though such encryption may increase the e2e security and privacy from the end user point of view, middle-box service providers (MSPs) may be unable to inspect the packet data in the middle. The increasing amount of encryption used on the public internet may thus limit the ability to inspect subscriber flows using traditional deep packet inspection (DPI) technologies.

Operators currently deploy DPI functions or other middle-boxes to analyze network traffic, to profile the subscriber, and to profile the application that flows through their network. There are multiple situations in which traditional DPI may not work and due to which user experience may be affected.

These issues can be illustrated in a variety of ways. For example, a DPI engine can report the usage as part of a flow and can classify each flow into a group of available application classes. Application insights from DPI can be used to create service plans. For example, an operator may be interested in creating a service plan based on usage. With a static service chaining (SC) policy, lack of coordination between ASP and operator and lack of DPI control can put operators in a hard situation to have a dynamic service plan creation. Even the few common reports that were generated for basic service plans will not be available when ASP moves to encrypted session.

In such cases, the application insights may aim to report the following: applications that consume the most data; top twn applications that takes maximum data flow on operator traffic; total data used over a specified time period (week or month) by applications; total mobile data used over a specified time period (week or month); average app data rate (KB/min) by user to create service plans; average foreground app data rate (KB/min) to create service plans; average background app data rate (KB/min) to create service plans; and application quality and performance. The purpose of such reports may be, for example, so that carriers can pinpoint how their top one hundred most used apps are impacting the carrier network and customer experience. There are also many other specific insights that may be sought, with the above merely being examples.

One conventional technique is to attempt to use encryption to by-pass middle-box functions. Some ASPs act as though application client feedback is sufficient for application delivery. Hence, the ASPs may enable encryption to bypass all middle-box and SC function on the access networks. From HTTP DASH protocol usage, it can be seen that user QoE may be compromised in such approaches.

Dynamic configuration of policies in middle-box may be desired by an ASP. For example, an ASP may want to introduce any policy changes dynamically by the ASP. Such an introduction, however, may need to be agreed beforehand between the ASP and the operator. The DPI polices that are currently adopted may be set up in a static or semi-static configuration. This approach may lack flexibility to introduce new services for ASP over the access networks.

Classifying traffic by website URLs alone may have an issue in that URLs do not provide full information on the mechanics of access. Also understanding of protocol behaviors context, user accessing the internet pattern, and type of traffic may need to be available inside the network.

The type of the traffic, for example a protocol like HTTP, FTP, BitTorrent, SIP, RTP, or the like, may need to be known. As a next step, the parameters of that specific protocol, for example for RTP the local IP address, the Registrar IP address, the CALL-ID, and so on, may need to be accessible inside the telecom network. Such information may enable actionable operations such as traffic admission, prioritization and shaping, restriction of access such as parental control, and support for new services and revenue models in the telecom network.

As ASP service is provided over encrypted SSL traffic, the above mentioned information may not be accessible as none of the network elements inside the operator network may be able to inspect the traffic that flows through them.

SUMMARY

According to a first embodiment, a method can include identifying metadata for an application flow, wherein the application flow is encrypted. The method can also include publishing the metadata in a core network, wherein the metadata is not encrypted when published.

In a variation, the method can be performed by a deep packet inspection mediatory entity.

In a variation, the publishing is performed by a network element of an operator, wherein the publishing is to a network of the operator.

In variations, the publishing the metadata can be performed in-band or off-band, with respect to the application.

In a variation, the identifying includes negotiating the metadata with an application server or application in a device.

In a variation, the identifying includes receiving the metadata from an application server or application in a device.

In a variation, the receiving is responsive to a request.

In a variation, the method can include receiving a request to register for notification of the metadata, wherein the publishing is responsive to the request.

In a variation, the method can include checking a new or existing flow to determine whether application flow metadata is needed and enriching the application flow when the application flow metadata is needed.

In a variation, the enriching comprises enriching a header of the application flow.

In a variation, the enriching comprises requesting the application flow metadata from an application server or application in a device.

In a variation, the method can further include creating a service policy model based on a receiver list of the application flow, and sending the service policy model.

In a variation, the sending the service policy model can include enriching a header of the service flow.

In a variation, the service policy model can include an identifier of the application flow.

In a variation, the method can further include indicating that an identifier of the service policy model is to be discarded.

In a variation, the indicating that the identifier is to be discarded can be performed in a control plane with respect to an application flow in a user plane.

According to a second embodiment, a method can include receiving metadata for an application flow, wherein the application flow is encrypted and wherein the metadata is not encrypted. The method can also include receiving the application flow. The method can further include forwarding the application flow after processing the application flow in accordance with the metadata.

In a variation, the method can be performed by a middle-box.

In a variation, the method can also include registering for notification of the metadata, wherein the metadata is received as the notification.

In a variation, the registering can be performed on a control plane with respect to an application flow in a user plane.

In a variation, the method further includes receiving a service policy model for the application flow, wherein the processing is based on the service policy model.

In a variation, the service policy model can include an identifier of the application flow.

In a variation, the method can further include receiving an indication that an identifier of the service policy model is to be discarded, and discarding the identifier based on the indication.

According to a third embodiment, a method can include receiving a request to generate metadata for an application flow. The method can also include providing the metadata responsive to the request.

In a variation, the method can be performed by an application on a device or an application server.

In a variation, the method can further include authenticating a requestor providing the request, wherein the providing the metadata is contingent on successful authentication of the requestor.

In a variation, the method can further include including the metadata in each packet header of the application flow.

In a variation, the metadata can include an identifier of the application flow.

According to fourth through sixth embodiments, an apparatus can include means for performing the method according to the first through third embodiments respectively, in any of their variants.

According to seventh through ninth embodiments, an apparatus can include at least one processor and at least one memory and computer program code. The at least one memory and the computer program code can be configured to, with the at least one processor, cause the apparatus at least to perform the method according to the first through third embodiments respectively, in any of their variants.

According to tenth through twelfth embodiments, a computer program product may encode instructions for performing a process including the method according to the first through third embodiments respectively, in any of their variants.

According to thirteenth through fifteenth embodiments, a non-transitory computer readable medium may encode instructions that, when executed in hardware, perform a process including the method according to the first through third embodiments respectively, in any of their variants.

According to tenth and eleventh embodiments, a system may include at least one apparatus according to the fourth or seventh embodiments in communication with at least one apparatus according to the fifth or eighth embodiments and further in communication with an apparatus according to the sixth or ninth embodiments, respectively in any of their variants.

BRIEF DESCRIPTION OF THE DRAWINGS

For proper understanding of the invention, reference should be made to the accompanying drawings, wherein.

DETAILED DESCRIPTION

Figure 1:
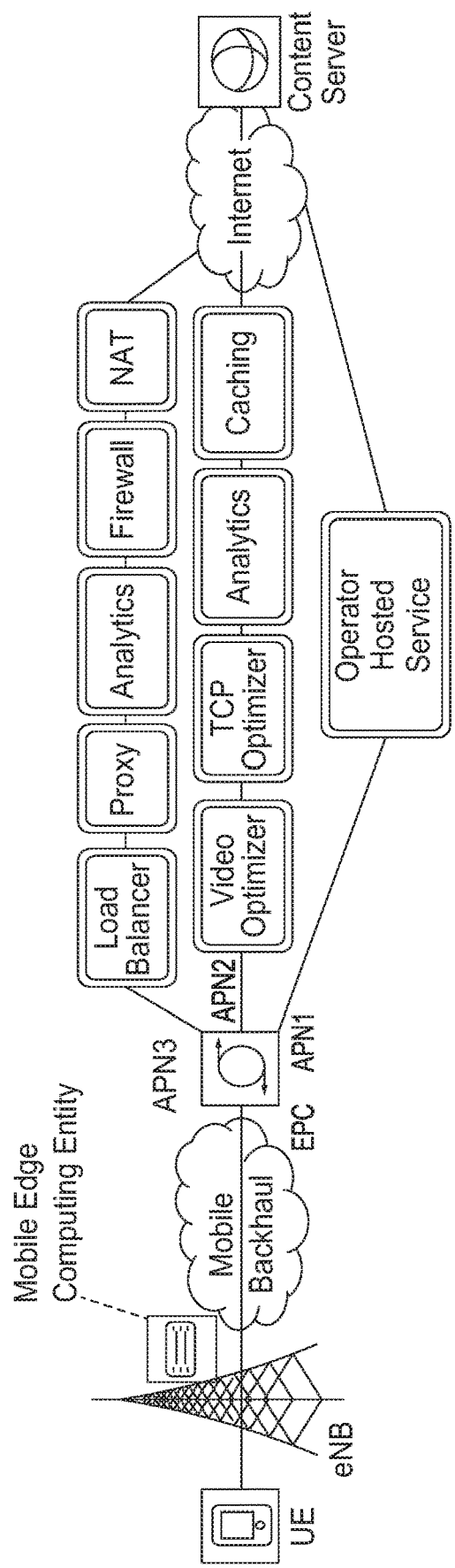
FIG. 1 illustrates various middle-boxes deployed by operators in a wireless SGi LAN interface.

Certain embodiments provide a mechanism that can enable an operator and ASP to work in a coordinated fashion. Certain embodiments, more particularly, may allow an operator to learn about the traffic characteristics from ASP and support middle-boxes functions to detect the flows for their policy enforcement. Furthermore, certain embodiments may allow operators to control the services even for encrypted traffic.

Certain embodiments can specify a mechanism to negotiate a network and application friendly policy between network operator and application service provider. Furthermore, certain embodiments may specify a protocol to send the information from ASP, broadly including application server in internet or application running in the devices, to a network element inside the operator network.

Thus, certain embodiments may provide a mechanism to receive the application flow information which operators would otherwise get from DPI-like functions from the application service provider (ASP), such as from OTT/Application server or application running in the end user device. Meanwhile, certain embodiments may still maintain user privacy.

More particularly, certain embodiments provide an identification mechanism (for both in-band and off-band) to negotiate and receive the application flow metadata from an application server or the application in the device. The application server or the application in the device can broadly be referred to as an information provider.

Certain embodiments can create a service policy model and send it, in various ways, to policy servers and middle-boxes. The policy servers can include, for example, PCRF in the case of a 3GPP based architecture. Middle-boxes can include NAT, firewall, Load balancers, and the like.

In certain embodiments, a designated entity, such as RACS, can be selected to interface with ASP networks. Furthermore, in certain embodiments the designated entity, such as RACS, can be allowed to represent the consolidated view of middle-box configuration requirements without exposing the operator network topology.

In certain embodiments, an ASP can reveal the flow related parameters without compromising on legal and privacy requirements to a remote operator network. Moreover, in certain embodiments an operator network can identify encrypted flows with the information supplied by the ASP. For example, certain embodiments may work well at transport or tunnel mode encryption at IP and SSL layers. Furthermore, certain embodiments may work well with 3G, Wi-Fi and LTE and beyond networks. Additionally, certain embodiments may be transparent to IPv4 and IPv6 network architecture.

For example, in certain embodiments a protocol is specified to allow a functional entity, which can be referred to generally as an information receiver, that resides inside the operator network to receive the application flow information from the information provider, such as an application server external to the operator network or the device that consumes the application service.

Figure 2:
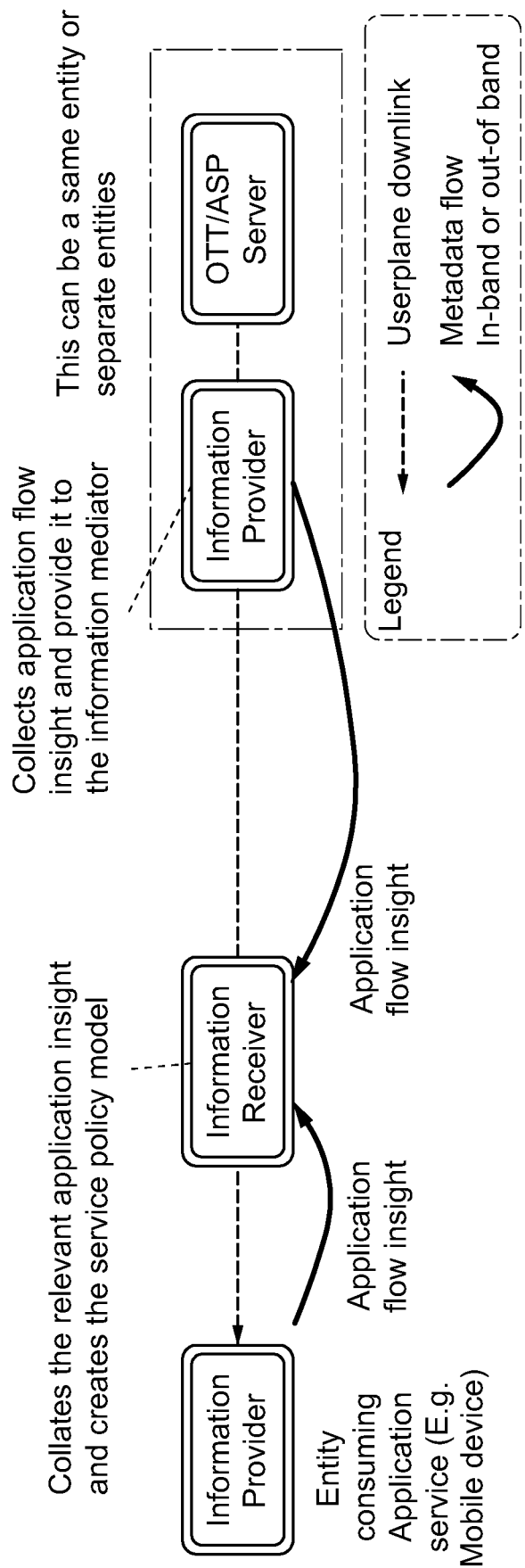
FIG. 2 illustrates basic protocol interactions between logical entities, according to certain embodiments.

FIG. 2 illustrates basic protocol interactions between logical entities, according to certain embodiments. As FIG. 2 depicts, the information provider can be the device which consume the application service or the application server that resides behind the core network of the operator or in the Internet.

The functional element of the information provider, which may be any suitable network element, can signal in near-real-time to the information receiver, which may be an application server or device, the information on the application flow metadata at the uplink or downlink interface. Under a business negotiation over a protocol between a network element and the application server, in-band or out-of-band or both can be a way to transport the information.

The network element that is an information receiver can distribute the service policy model derived from the application flow metadata information to other network entities, like middle-boxes or policy servers residing inside the operator network, to support the flow identification and then the policy enforcement.

The information provider either can be a standalone middle-box with the role to terminate the encrypted HTTP/any application flow and to do a deep packet inspection of the application traffic or can be running at the OTT/ASP application server. As depicted, even a device such as a terminal device can act as an information provider.

The information receiver can be any inline network entity anywhere in the wired/wireless operator network. The information receiver can create service policy model from application flow insight to send it to other network entities which are either a standalone middle-box inline in the user plane traffic flow with the role to execute the required actions in real-time based on the received application insight or an offline software entity which collects the information for offline processing like big data analytics.

In case of a mobile network, an information receiver can reside at a mobile edge computing (MEC) platform or mobile core or any network element in the access network between the device and the Internet. Even in case of wireline networks, the information receiver can be part of any network element that is in line to the user plane traffic and has capability to work on corresponding layer protocols used to transport the information, such as TCP or IP or HTTP or the like.

A valid implementation may involve the availability of an Internet side entity, which can be referred to as an application information provider, capable of providing the relevant application flow insight to a network side entity, referred to as an information receiver, capable of collecting and collating the relevant application insight to create the service policy model and sending the policy to another network side entity, which can be referred to as a middle-box, capable of receiving, interpreting and using the received insight in the middle-box's operation.

Figure 3:
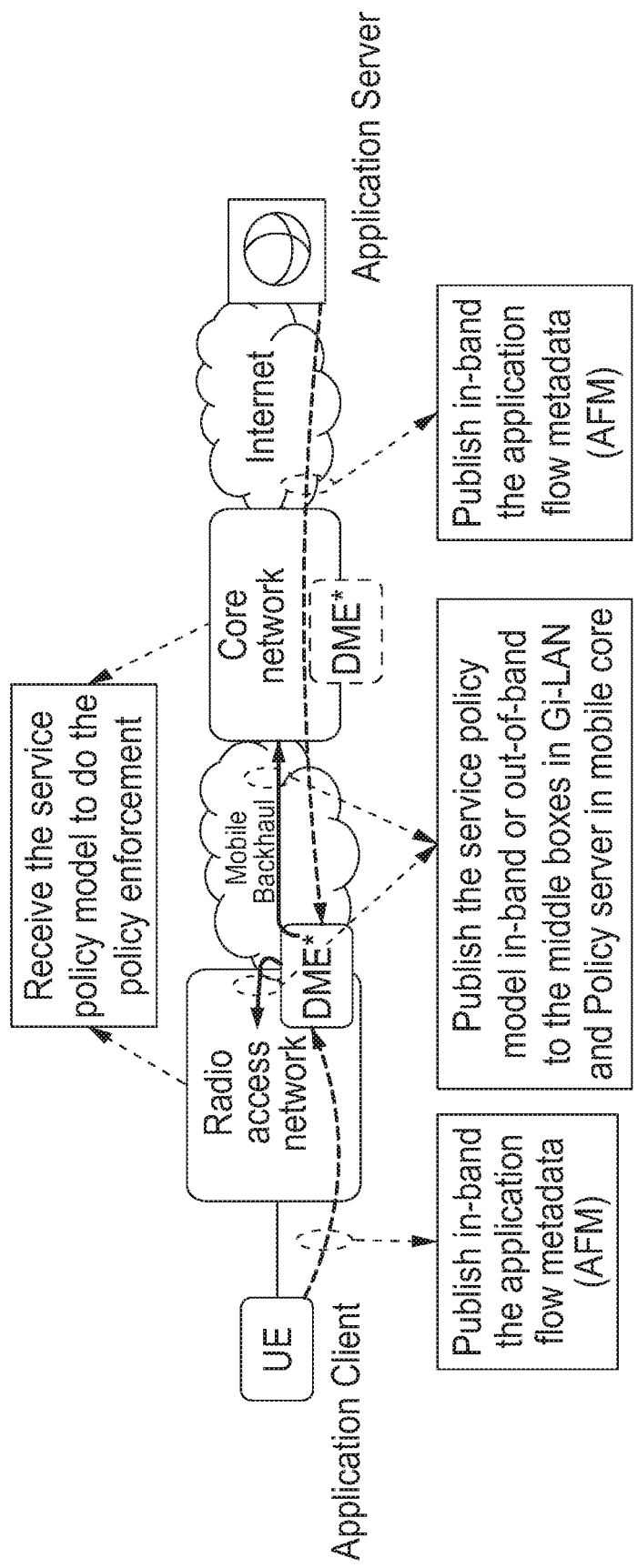
FIG. 3 illustrates implementation in an MEC platform of a mobile network, according to certain embodiments.

FIG. 3 illustrates implementation in an MEC platform of a mobile network, according to certain embodiments. In the example depicted in FIG. 3, an implementation possibility is that an information receiver is in an MEC platform or RACS in a radio access network (RAN) of the mobile network. This device can be referred to as a DPI mediatory entity (DME). The DME can act as the information receiver. The DME can be a software entity running on RACS scoped to continuously get the application data for each TCP flow from the application server or the UE that is transmitting data in the corresponding bearer. Here, the application server or the UE can act as the information provider. The application side insight on the flow level can be referred to as application flow metadata (AFM). Based on the AFM, the DME may be able to create a service policy model (SPM).

The SPM can be a structure that contains application protocol used by the TCP flow, parameters of that specific protocol, and an application flow identifier. This derived information, SPM can then be passed to middle-boxes and a policy server to perform specific policy enforcement. For example, a policy may be to down the peer-to-peer (P2P) traffic.

In certain embodiments, AFM for a specific application flow can be available at a DME immediately after the start of the application session. In addition, the flow identifier can be continuously embedded to the user plane packets by the information provider, such as Application server or UE, during the entire lifetime of the application session e.g. till the user watches the finishes watching the selected video in case of a you tube application. With the known flow identifier from the SPM, middle-box can dynamically do the flow identification in the user plane flows.

The AFM can be exposed to the information receivers either in-band via protocol header or via a dedicated off-band control connection. The AFM provider can be any entity in an external network such as, for example, an application server, CDN node, origin server, adaptation gateway acting as a middle-box in the internet, application running in a device, and so on.

Adding information to the protocol headers is a mechanism that can piggyback information on the user plane packets. Thus, the additional information can be received by a DME with the information's full context, for example including the UE, flow and application identity. The out-of-band connection may be used, for example, when the arrival of the information through in-band is not guaranteed. For example, in some communication systems intermediate firewalls may strip off the extra protocol headers. The AFM information transmitted via the off-band connection may involve sending additional context information to identify the connection to which the AFM information corresponds. The in-band enrichment option can be done by adding optional/additional fields in the TCP header or IPV6 extension headers or HTTP header, in case of plain text.

The SPM can be conveyed from the DME via two alternatives: using in-band protocol header enrichment of the uplink user plane packets themselves or via a dedicated off-band connection established between the DME and the middle-box or policy server. Regardless of the type of the SPM receiver, the SPM receiver can be internal to the operator network. The header enrichment can be a mechanism that piggybacks information on the user plane packets. Thus, the additional information can be received by the DME with its full context, such as the UE, flow and application identity. The off-band connection can be used when the information receiver is not an inline component of the user plane traffic, as in the case of a big data analytics server. The service policy model information transmitted via the off-band connection may involve sending additional context information to identify the user connection to which the service policy model corresponds. The in-band enrichment option can be done by adding optional/additional fields in the TCP header or IPV6 extension headers or HTTP header, in case of plain text.

The SPM type of information can also be passed to eNB for supporting the eNB's flow identification. In addition, both in-band and out-of-band information transfer mechanism may have requirements with respect to QoS and security. Authentication and encryption mechanisms can provide the integrity and authenticity of the information.

AFM can be sent also in band in L2TP in wire lines, or in any other protocols used that have some free bits. Alternatively, a specialized protocol can be used.

Figure 4:
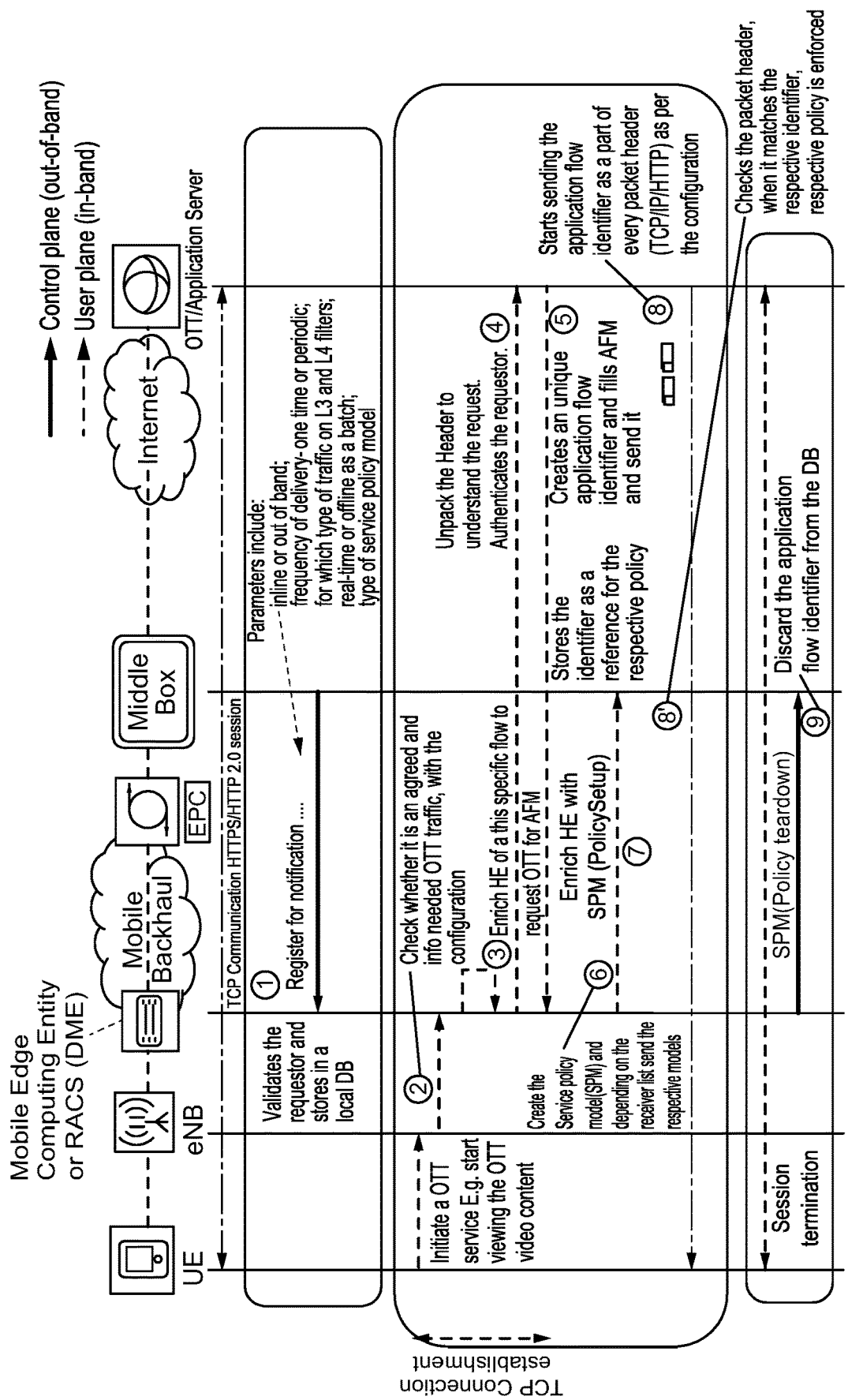
FIG. 4 illustrates a signal flow diagram of a method and system according to certain embodiments.

FIG. 4 illustrates a signal flow diagram of a method and system according to certain embodiments. In this example, OTT/ASP or application server can be considered the information provider, the DPI mediator entity can be considered the information receiver, and the middle-box can be the SPM receiver.

This configuration scheme covers several options of the operator deployment. Three possible options to configure and bootstrap the systems are the following. According to a first option, an operator can configure a list of IP addresses of OTT/ASP server, which can be the information provider, the DME, which can be the information receiver, and the middle-boxes in corresponding servers, which can be information provider and/or receiver.

According to a second option, the operator can supply a list of DME IP address to an OTT/ASP server and the OTT/ASPs can configure their servers to accept a request for the information, namely for application flow metadata (AFM). DME can implement a service discovery protocol to get the OTT/ASP server endpoint IP address periodically by using Rest/HTTP or any web interface provided by OTT/ASP server. Security keys can be shared across DME and OTT server for authenticating the request and the information accordingly.

According to a third options, an operator can configure the internal DNS server (iDNS) with a specific URL name that is supplied by OTT/ASP, and also another entry for DME. So that DME learns the OTT/ASP server access information during system start-up by doing a look up to resolve the IP address and the same way middle-boxes learns the access information of the DME.

FIG. 4 explains a way that the application flow information can be collected, segregated and contextualized to provide the specific policy models to middle-boxes for encrypted sessions. This figure describes message interactions that can happen between information provider, information mediator, and information receiver, as shown in FIG. 3.

As shown in FIG. 4, at 1 the middle-boxes during the start-up can register with DME for a specific type of the service policy model, type of information sharing (in-band, out of band), frequency of information need, type of real-timeliness of the information need (on real-time or aggregated for a batch delivery), and so on. The DME can authenticate the request and the information receiver with the predefined security keys.

At 2, as the OTT/ASP service is delivered over TCP, ACK can be generated periodically from the client towards the OTT/ASP server. This ACK packet can reach the DME.

Furthermore, at 3, the DME can internally monitor the traffic to check whether the traffic pertains to the configured OTT/ASP, for example based on a domain name in the HTTP information. If the traffic pertains to the configured OTT/ASP, the DME can send the request for AFM through a preconfigured in-band approach, such as adding info to IPV6 header or TCP header or HTTP header.

At 4, the OTT/ASP server, when the TCP/IP/HTTP packet is from the defined DME, can authenticate the integrity of the request from DME and understands the request. Then, at 5, the OTT/ASP server can forward the application flow metadata to the DME using an in-band mechanism in a periodic or one time fashion or periodic for as long as the application flow exists. The structure of the AFM can be be pre-negotiated between the OTT/ASP server and the DME. There are several possible ways to communicate such information as part of HTTP or IPv4 or IPv6 or TCP headers to DME. Those can be agreed between the operator and the OTT/ASP. However the information is delivered, the information can then be consumed by the DME.

When the DME receives the AFM from the OTT/ASP server at 6, the DME can internally process the information in the header, and can perform necessary segregation. The DME can also create respective service policy model(s) for different middle-boxes. Such creation may depend on the needs of the middle-boxes.

At 7, the DME can distribute the service policy model to middle-boxes depending upon the registration (in-band or out of band). Then, at 8, an application server can send the application flow identifier with all the packets in that specific application flow with an in-band option towards the operator network. When the middle-box does a packet header check and the packet header matches the application flow identifier in the middle-box's table, the middle-box can enforce the respective policy.

At 9, when the application session terminates, the DME can instruct the middle-boxes to do a policy teardown. Each middle-box can remove any instance of that respective application identifier from the middle-box's database.

According to certain embodiments, therefore, message exchange between an operator designated entity and a remote ASP can be unique. As described in FIG. 4, entity DME functions may be unique and the information that gets sent/delivered may be easily identified. Furthermore, in certain embodiments description of middle-box policies model and identification of flow for subscriber can be unique in each middle-box.

Certain embodiments may have various benefits and/or advantages. For example, in certain embodiments, for an encrypted session, an operator can learn and understand how to provide flow/packet treatment. Furthermore, in certain embodiments service policy models that are derived may be readily available and easy to integrate for consumption by the middle-boxes.

Additionally, certain embodiments can provide a probeless architecture that may be suitable for a Telco cloud. For example, certain embodiments can provide tight integration for operator, application service provide and network vendor, based on probe-less architecture.

Figure 5:
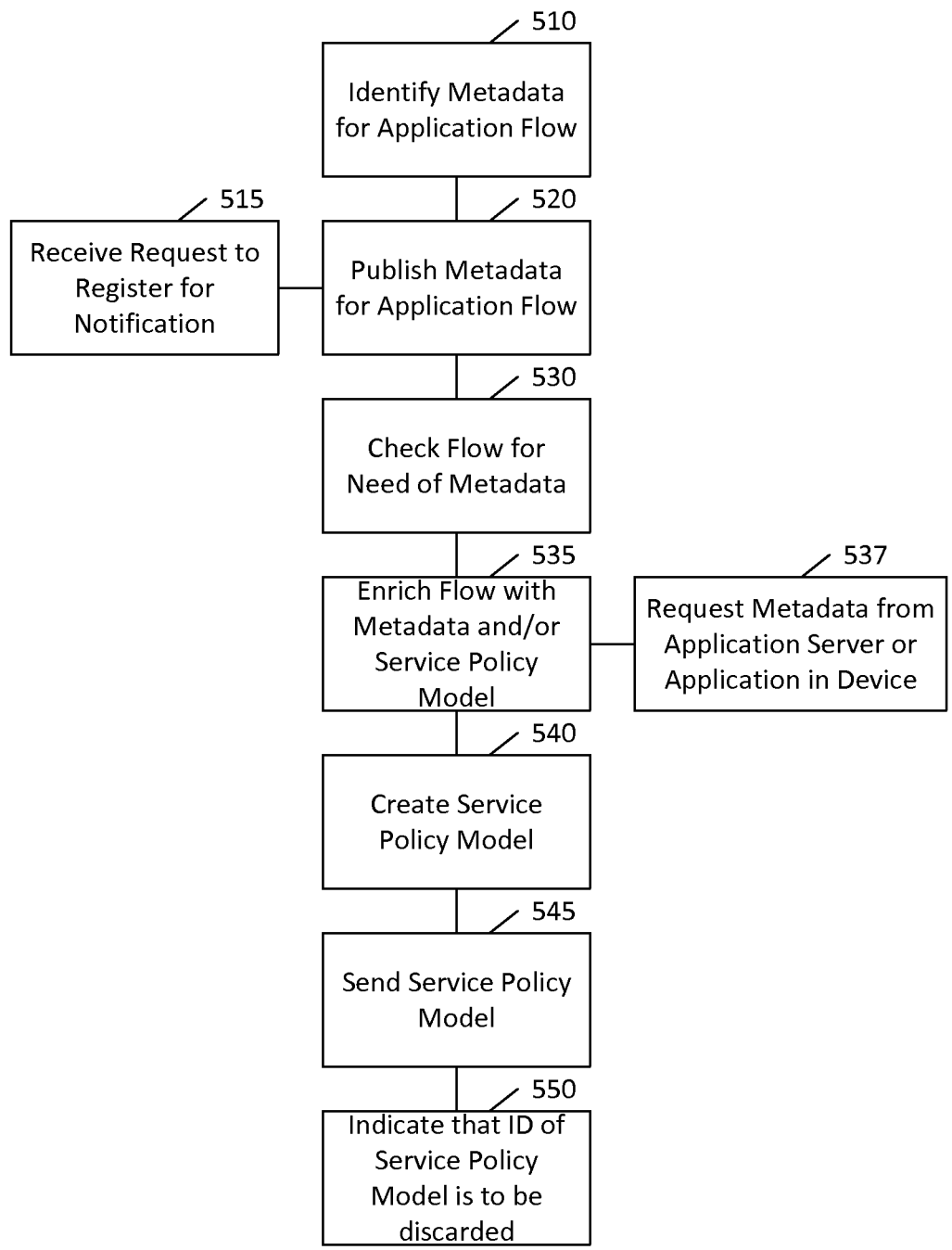
FIG. 5 illustrates a method according to certain embodiments.

FIG. 5 illustrates a method according to certain embodiments. The method of FIG. 5 may be performed by a deep packet inspection mediatory entity, otherwise known as an information receiver. As shown in FIG. 5, a method can include, at 510, identifying metadata for an application flow. This can be done even when the application flow itself is an encrypted flow. The identifying can include negotiating the metadata with an application server or application in a device. Furthermore, the identifying can include, at 504, receiving the metadata from an application server or application in a device. The receiving can be responsive to a request at 502.

The method can also include, at 520, publishing the metadata in a core network, wherein the metadata is not encrypted when published. In certain embodiments, the publishing can be performed by a network element of an operator, wherein the publishing is to a network of the operator. Furthermore, in certain embodiments, the publishing the metadata can be performed in-band or off-band, with respect to the application.

The method can also include, at 515, receiving a request to register for notification of the metadata. The publishing at 520 can be responsive to the request at 515.

The method can also include, at 530, checking a new or existing flow to determine whether application flow metadata is needed and, at 535, enriching the application flow when the application flow metadata is needed. The enriching can include enriching a header of the application flow. For example, the enriching can include, at 537, requesting the application flow metadata from an application server or application in a device.

The method can further include, at 540, creating a service policy model. This creation may be based on a receiver list of the application flow or on other factors. The method can also include, at 545, sending the service policy model. Sending the service policy model can include enriching a header of the service flow similarly as when providing the application flow metadata. The service policy model can include an identifier of the application flow.

The method can additionally include, at 550, indicating that an identifier of the service policy model is to be discarded. The indicating that the identifier is to be discarded can be performed in a control plane with respect to an application flow in a user plane.

Figure 6:
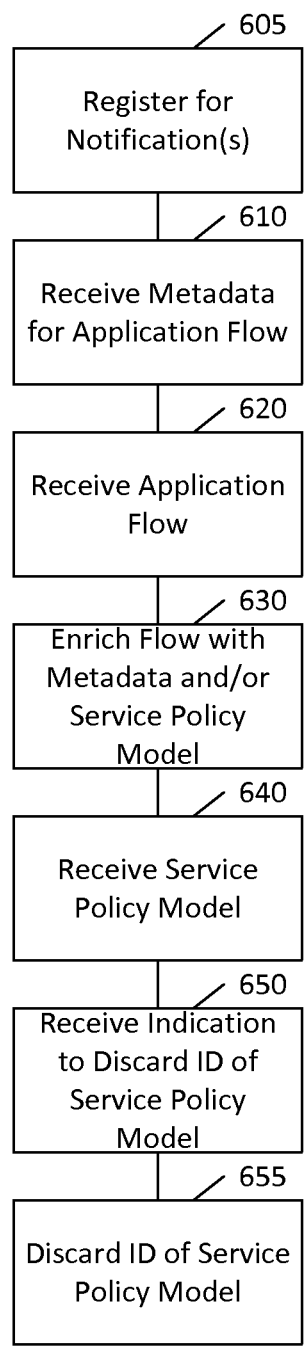
FIG. 6 illustrates another method according to certain embodiments.

FIG. 6 illustrates another method according to certain embodiments. The method of FIG. 6 may be usable with the method of FIG. 5. The method may be performed by, for example, a middle-box, otherwise known as an information receiver.

As shown in FIG. 6, a method can include, at 610, receiving metadata for an application flow. The application flow can be encrypted and the metadata can be unencrypted or not encrypted by the same technique as the application flow itself. The method can further include, at 620, receiving the application flow. The method can additionally include, at 630, forwarding the application flow after processing the application flow in accordance with the metadata.

The method can further include, at 605, registering for notification of the metadata. This may be the same registration request that was received at 515 in FIG. 5. The metadata can then be received as the notification, for example as the published metadata at 520 in FIG. 5. The registering, both in terms of the request and reply or either of them, can be performed on a control plane with respect to an application flow in a user plane.

The method can also include, at 640, receiving a service policy model for the application flow. The processing of the application flow can be based on the service policy model.

The service policy model can include an identifier of the application flow. The method can also include, at 650, receiving an indication that an identifier of the service policy model is to be discarded, and, at 655, discarding the identifier based on the indication.

Figure 7:
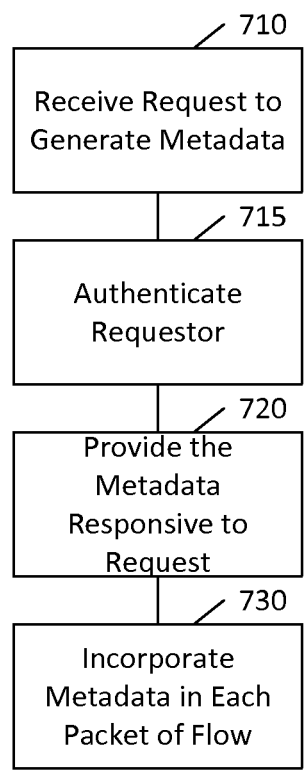
FIG. 7 illustrates a further method according to certain embodiments.

FIG. 7 illustrates a further method according to certain embodiments. The method of FIG. 7 can be performed by an application on a device or an application server, otherwise known as an information provider. The method of FIG. 7 may be usable with the methods of FIGS. 5 and 6.

As shown in FIG. 7, a method can include, at 710, receiving a request to generate metadata for an application flow. This may be the request sent at 537 in FIG. 5. The method can also include, at 720, providing the metadata responsive to the request.

The method can further include, at 715, authenticating a requestor providing the request. Providing the metadata can be contingent on successful authentication of the requestor. The authentication can be performed based on the request.

The method can further include, at 730, incorporating or including the metadata in each packet header of the application flow. The metadata can include an identifier of the application flow. The metadata provided in the flow may have the same identifier previously provided in response to the request or may have an identifier generated by the requestor. The metadata provided to the requestor may be metadata that is used to generate a service policy model. Such detailed metadata does not need to be included in every packet.

Figure 8:
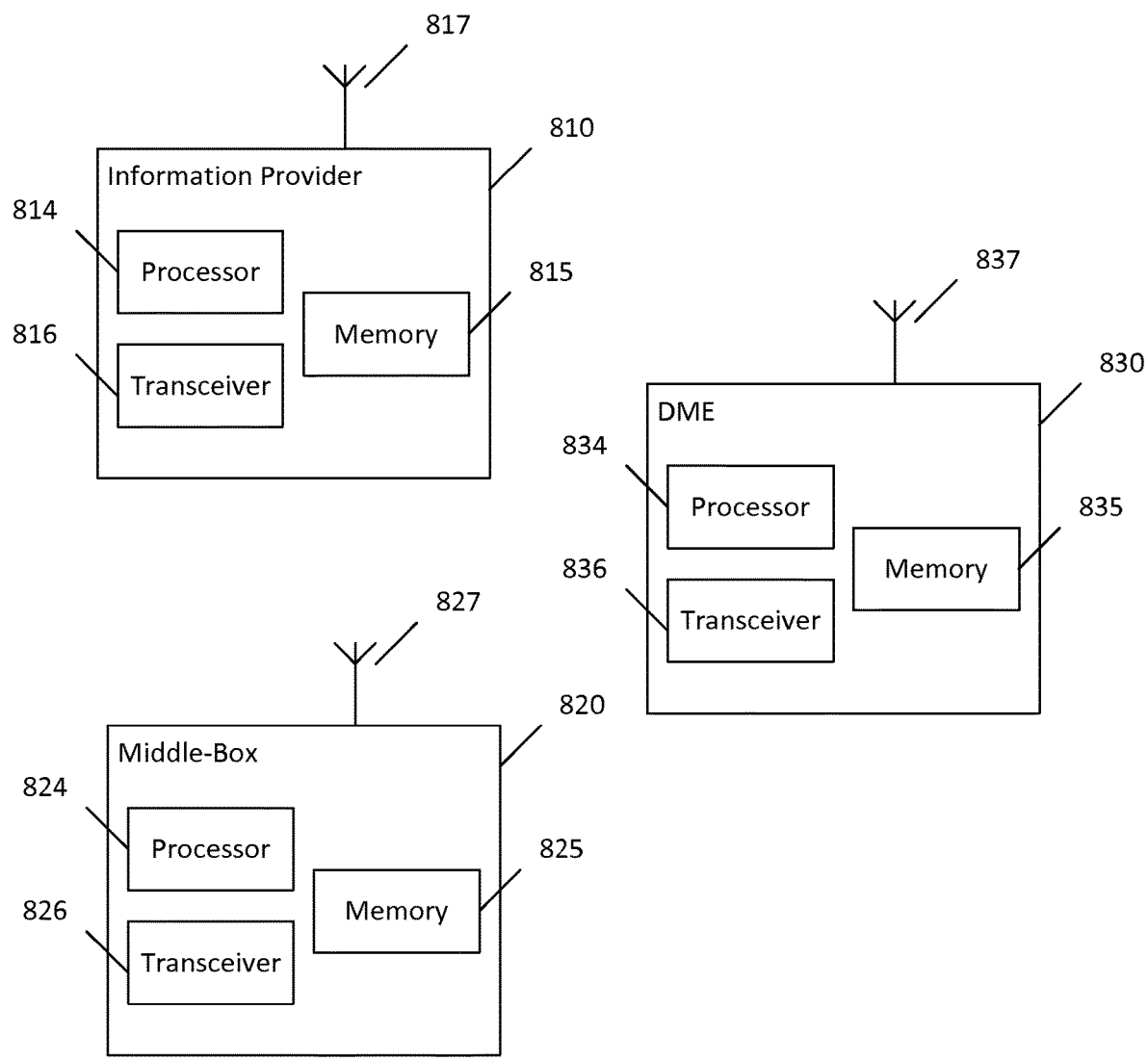
FIG. 8 illustrates a system according to certain embodiments.

FIG. 8 illustrates a system according to certain embodiments of the invention. In one embodiment, a system may include multiple devices, such as, for example, at least one information provider 810, at least one middle-box 820, such as any of those shown in FIG. 1, and at least one DME 830.

Each of these devices may include at least one processor, respectively indicated as 814, 824, and 834. At least one memory can be provided in each device, and indicated as 815, 825, and 835, respectively. The memory may include computer program instructions or computer code contained therein. The processors 814, 824, and 834 and memories 815, 825, and 835, or a subset thereof, can be configured to provide means corresponding to the various blocks of FIGS. 5-7.

As shown in FIG. 8, transceivers 816, 826, and 836 can be provided, and each device may also include an antenna, respectively illustrated as 817, 827, and 837. Other configurations of these devices, for example, may be provided. For example, DME 830 may be configured for wired communication, in addition to or instead of wireless communication, and in such a case antenna 837 can illustrate any form of communication hardware, without requiring a conventional antenna. In certain embodiments, all of the involved devices are wire-line devices, as mentioned above.

Transceivers 816, 826, and 836 can each, independently, be a transmitter, a receiver, or both a transmitter and a receiver, or a unit or device that is configured both for transmission and reception.

Processors 814, 824, and 834 can be embodied by any computational or data processing device, such as a central processing unit (CPU), application specific integrated circuit (ASIC), or comparable device. The processors can be implemented as a single controller, or a plurality of controllers or processors.

Memories 815, 825, and 835 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as information provider 810, middle-box 820, and DME 830, to perform any of the processes described herein (see, for example, FIG. 5-7). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 8 illustrates a system including a information provider, middle-box, and DME, embodiments of the invention may be applicable to other configurations, and configurations involving additional elements. For example, not shown, additional information providers may be present, and additional core network elements may be present, as illustrated in FIGS. 1, 3, and 4.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

List of Abbreviations

ASP Application Service Provider
CDN Content Delivery Network
DL Downlink
eNB Evolved Node B
GW Gateway
HSPA High Speed Packet Access
HTTP Hypertext Transfer Protocol
IP Internet Protocol
IR Information Receiver
LTE Long Term Evolution
MEC Mobile Edge Computing
OTT Over The Top
RACS Radio Application Cloud Server
RAN Radio Access Network
RNC Radio Network Controller
RTCP Real Time Control Protocol
RTP Real Time Protocol
SPM Service Policy Model
TCP Transmission Control Protocol
TLS Transport Layer Security
UE User Equipment
UL Uplink
UMTS Universal Mobile Telecommunication System
WCDMA Wideband Code Division Multiple Access

We claim:

1. A method, comprising:
   identifying metadata for an application flow, wherein the application flow is encrypted;
   publishing the metadata in a core network, wherein the metadata is unencrypted when published;
   checking the application flow to determine whether the metadata is needed;
   enriching the application flow when the metadata is needed;
   creating a service policy model based on a receiver list of the application flow; and
   sending the service policy model to respective receivers of the receiver list, wherein the method is performed by a deep packet inspection mediatory entity in a mobile edge computing platform,
wherein the publishing is performed by a network element of an operator, and
wherein the service policy model comprises an identifier of the application flow.

2. The method of claim 1, wherein the publishing is to a network of the operator.

3. The method of claim 1, wherein the publishing the metadata is performed at least one of in-band or off-band, with respect to the application.

4. The method of claim 1, wherein the identifying comprises negotiating the metadata with an application server or application in a device.

5. The method of claim 1, wherein the identifying comprises receiving the metadata from an application server or application in a device.

6. The method of claim 5, wherein the receiving is responsive to a request.

7. The method of claim 1, further comprising:
receiving a request to register for notification of the metadata, wherein the publishing is responsive to the request.

8. The method of claim 1, wherein the enriching comprises enriching a header of the application flow.

9. The method of claim 1, wherein the enriching comprises requesting the metadata from an application server or application in a device.

10. The method of claim 1, wherein the sending the service policy model comprises enriching a header of the service flow.

11. The method of claim 1, further comprising:
indicating that an identifier of the service policy model is to be discarded.

12. The method of claim 11, wherein the indicating that the identifier is to be discarded can be performed in a control plane with respect to an application flow in a user plane.

13. A method, comprising:
receiving metadata for an application flow, wherein the application flow is encrypted and wherein the metadata is unencrypted;
receiving the application flow;
forwarding the application flow after processing the application flow in accordance with the metadata; and
receiving, according to a receiving list of the application flow, a service policy model for the application flow, wherein the processing is based on the service policy model,
wherein the service policy model comprises an identifier of the application flow.

14. The method of claim 13, wherein the method is performed by a network communication middle-box.

15. The method of claim 13, further comprising:
registering for notification of the metadata, wherein the metadata is received as the notification;
wherein the registering is performed on a control plane with respect to an application flow in a user plane.

16. The method of claim 13, further comprising:
receiving an indication that an identifier of the service policy model is to be discarded; and
discarding the identifier based on the indication.

* * * * *